United States Patent [19]

Greulich

[11] Patent Number: 4,718,624
[45] Date of Patent: Jan. 12, 1988

[54] FOLDING MICROPHONE STAND

[75] Inventor: Robert G. Greulich, Cranford, N.J.

[73] Assignee: Atlas Sound Division of American Trading and Production Corp., Parsippany, N.J.

[21] Appl. No.: 868,500

[22] Filed: May 30, 1986

[51] Int. Cl.[4] .............................. F16M 13/00
[52] U.S. Cl. ............................ 248/158; 248/291
[58] Field of Search ............ 248/158, 160, 81, 104, 248/274, 159, 121, 291, 346; 403/92, 93, 120, 145, 149

[56] References Cited

U.S. PATENT DOCUMENTS

| 183,985 | 10/1876 | Staehlen | 248/160 |
| 2,343,819 | 3/1944 | Taylor | 403/93 |
| 2,463,082 | 3/1949 | Brown | 403/92 |
| 2,487,401 | 11/1949 | Turner | 403/92 |
| 3,547,054 | 12/1970 | Caldwell | 403/93 |
| 3,599,924 | 8/1971 | Allen | 248/158 |
| 3,948,535 | 4/1976 | Negi | 403/93 |

FOREIGN PATENT DOCUMENTS

| 415622 | 7/1910 | France | 248/160 |
| 264551 | 1/1950 | Switzerland | 403/93 |
| 142736 | 5/1920 | United Kingdom | 403/93 |

Primary Examiner—Reinaldo P. Machado
Assistant Examiner—A. Chin-Shue
Attorney, Agent, or Firm—Blum Kaplan

[57] ABSTRACT

A folding microphone stand has a stand tube which is pivotally supported in a heavy cast base. Locking means are provided for securing the stand tube in an erect or a stored position.

12 Claims, 35 Drawing Figures

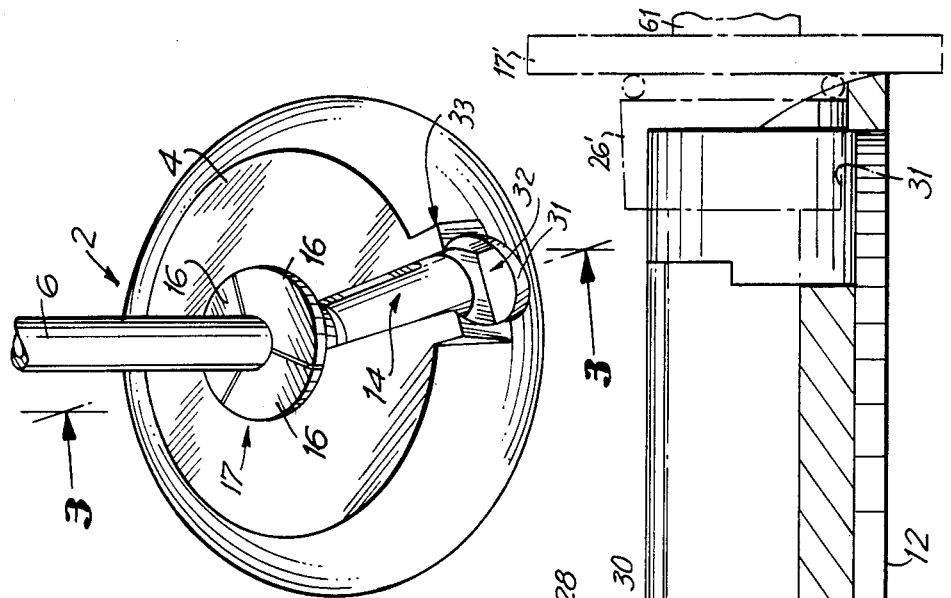
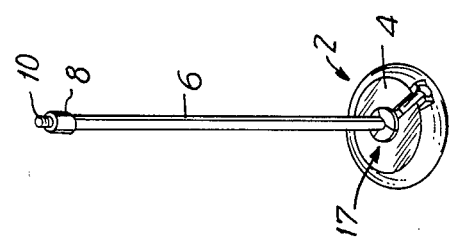
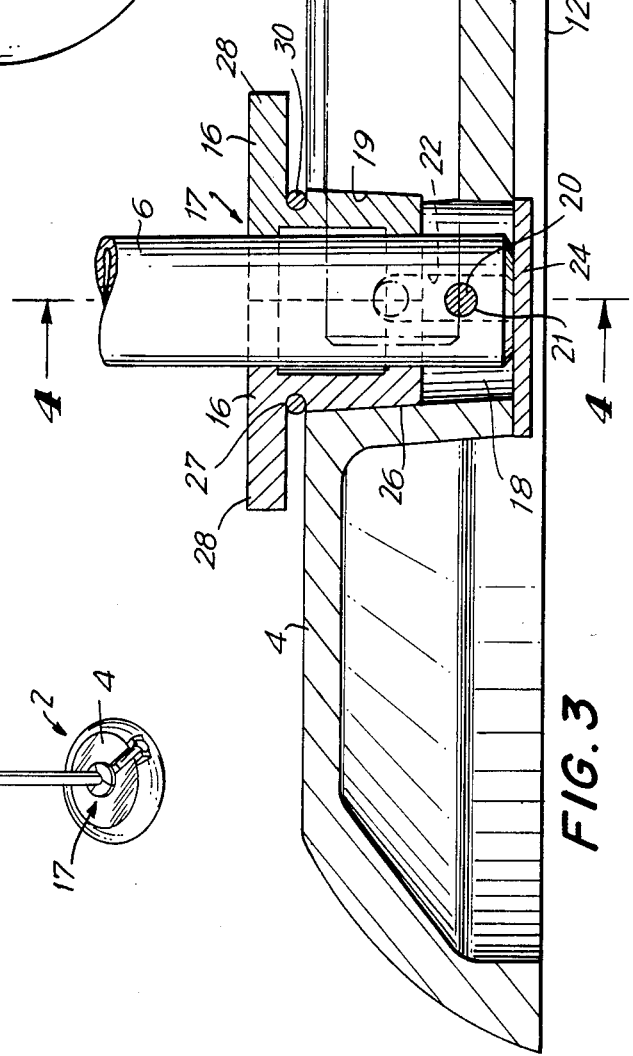
FIG. 1
FIG. 2
FIG. 3

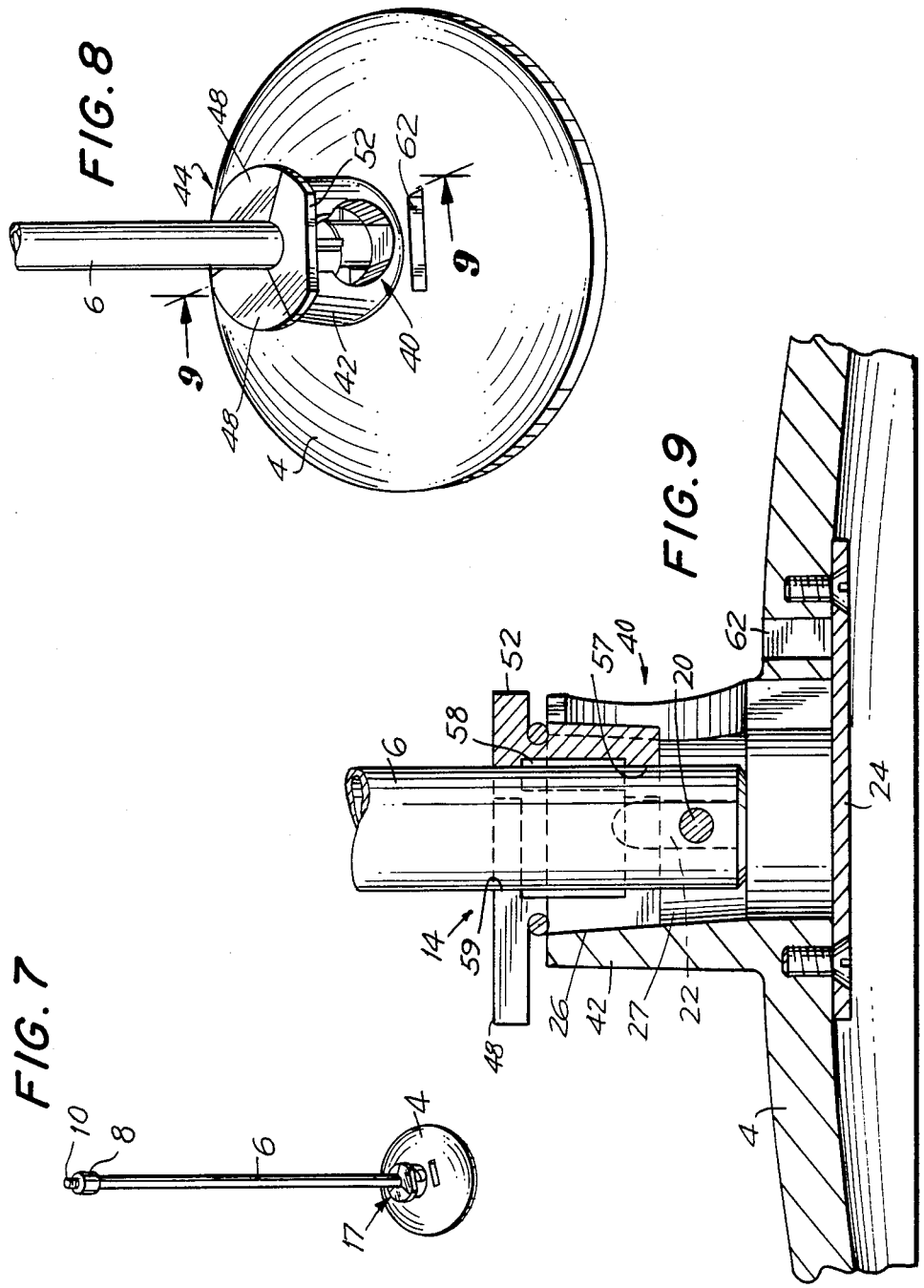

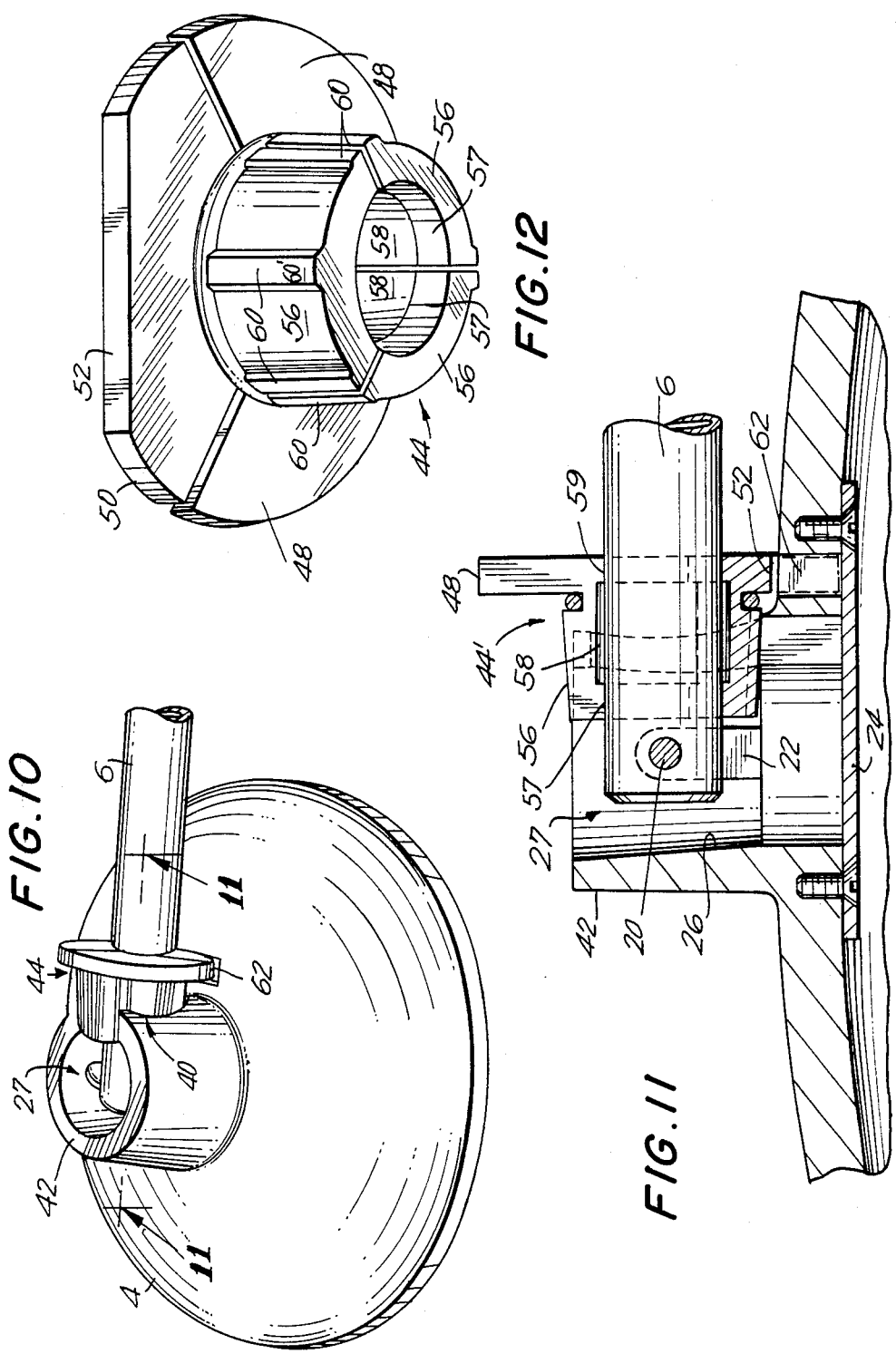

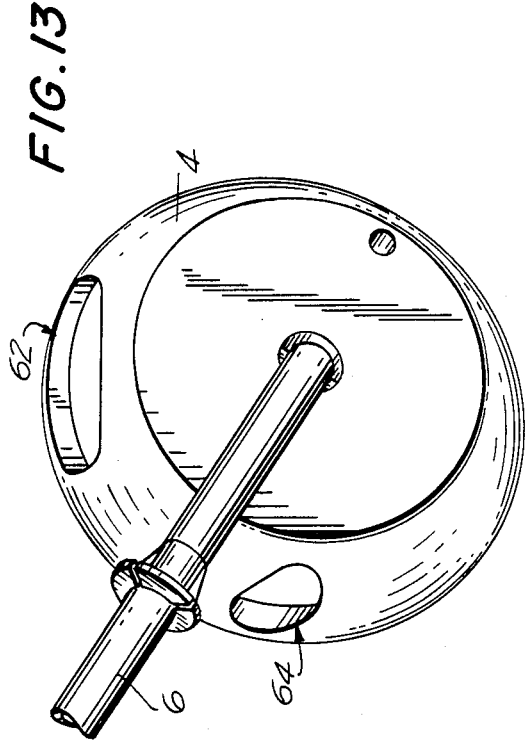
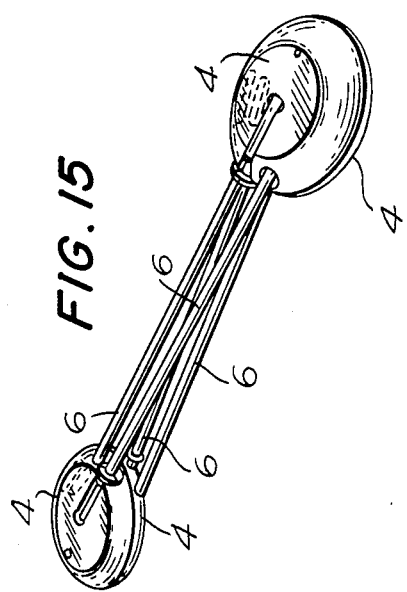
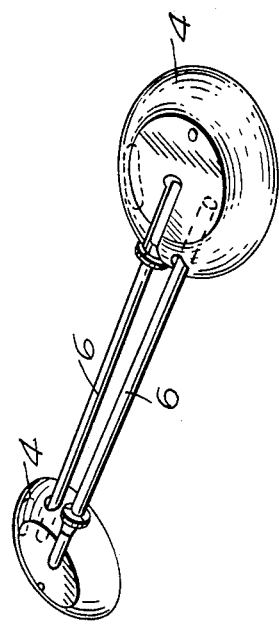

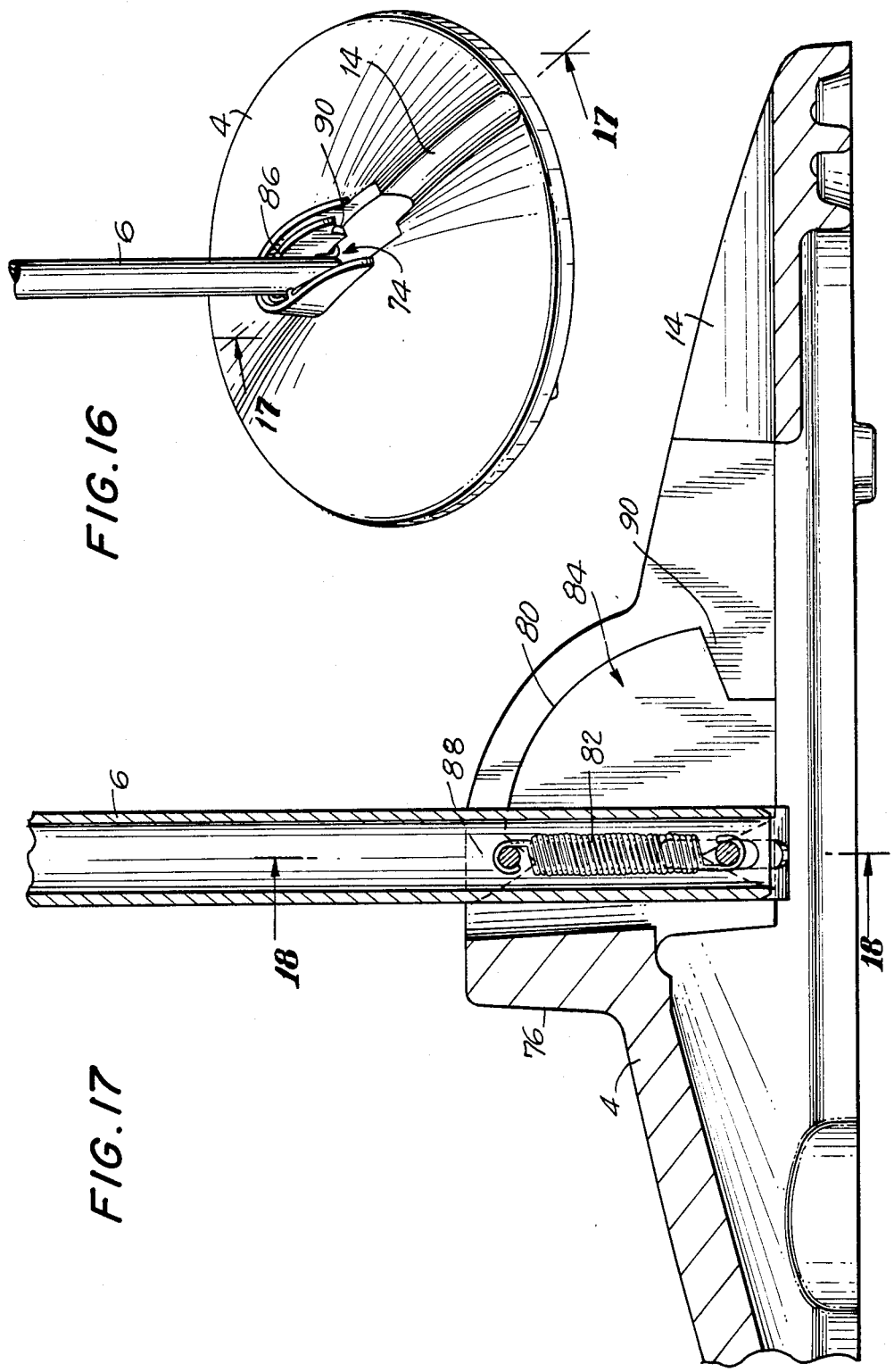

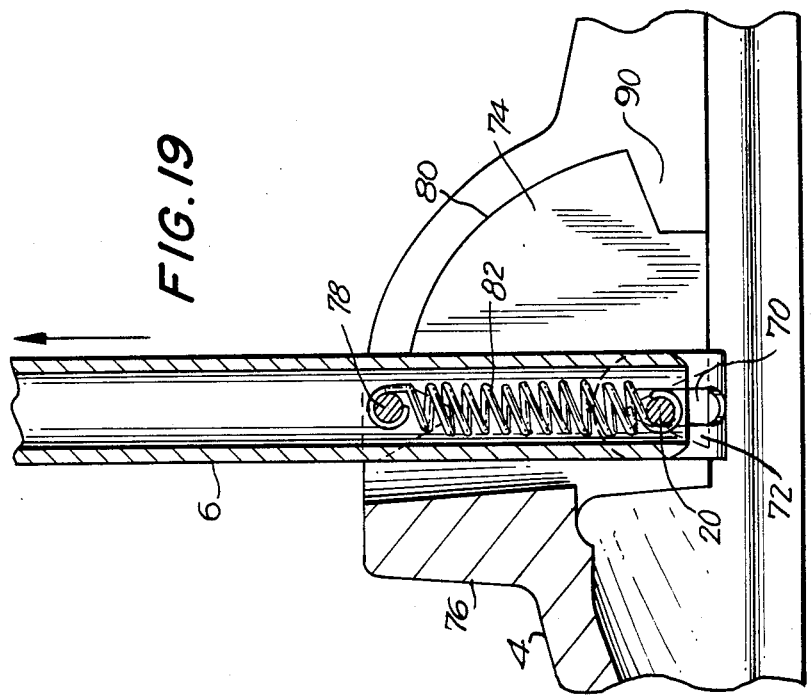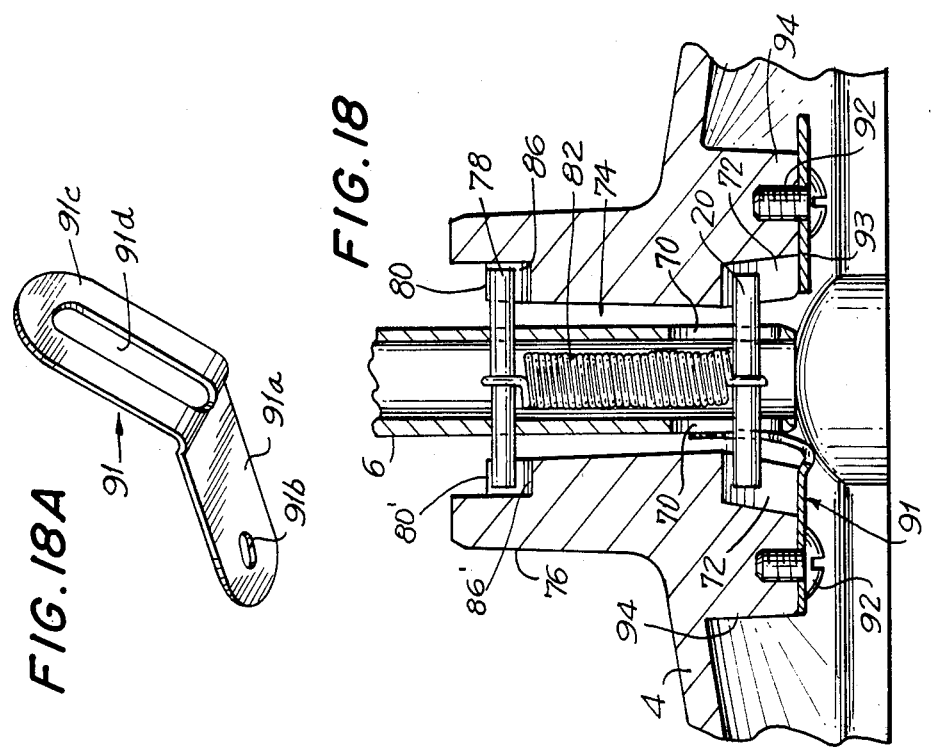

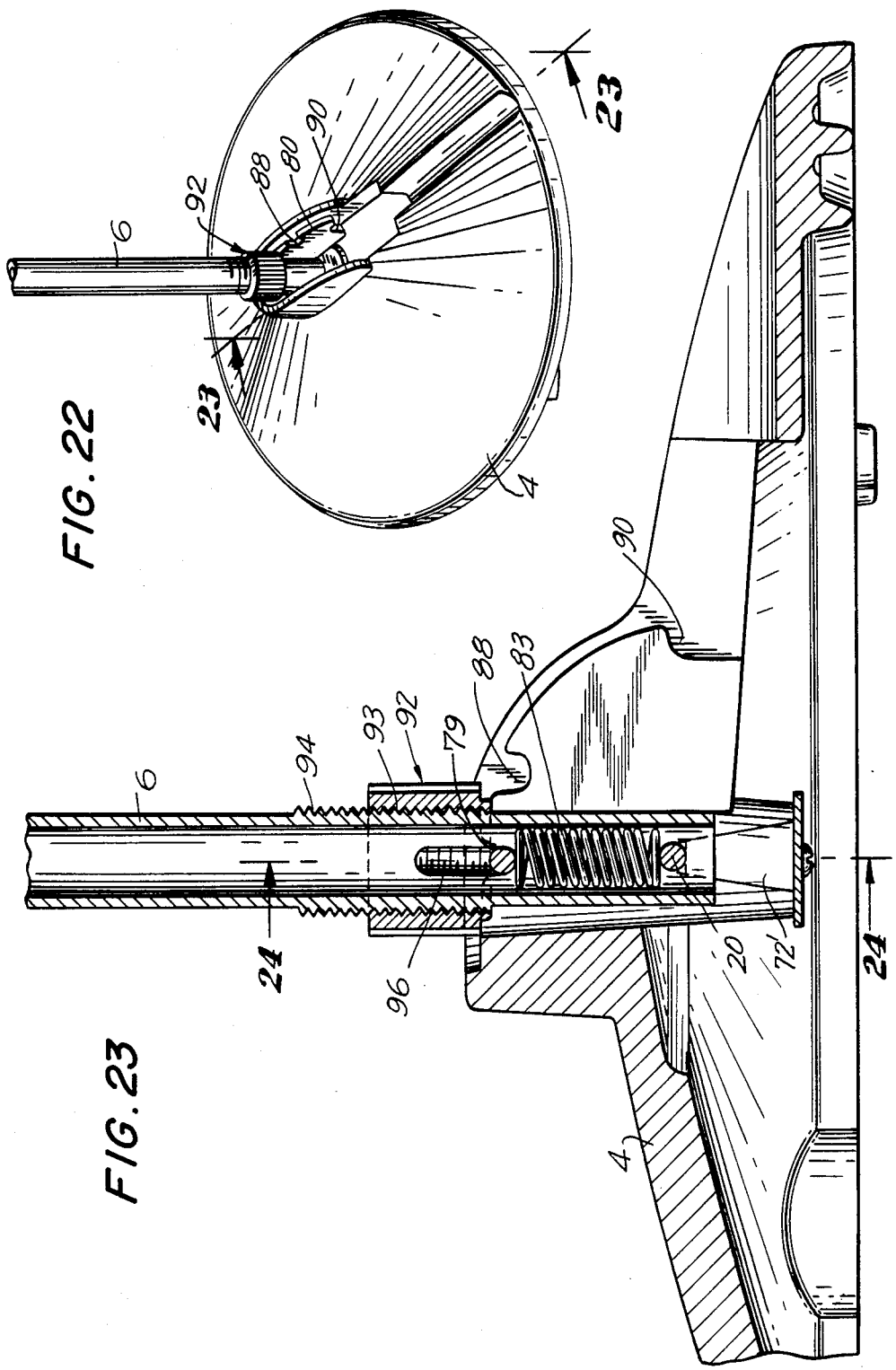

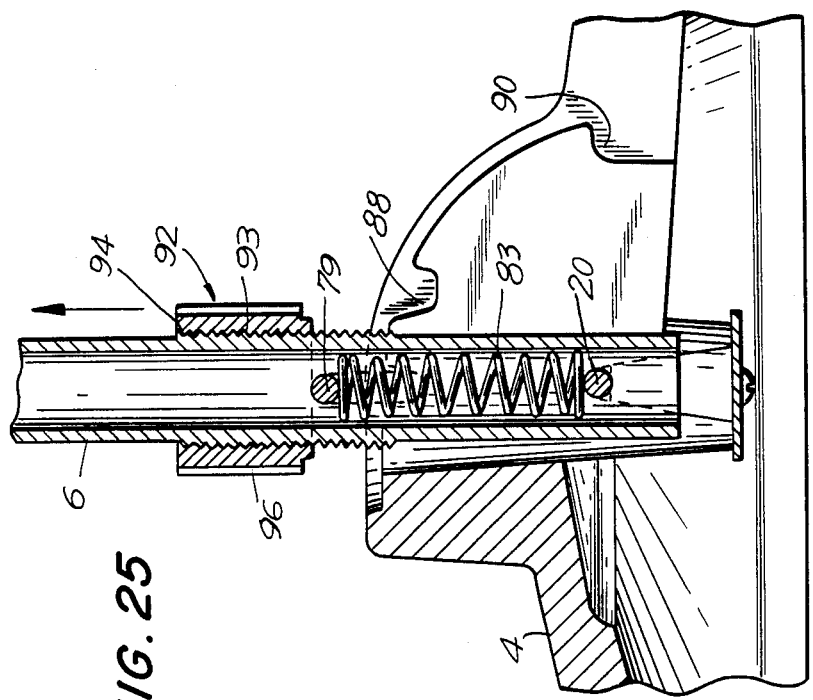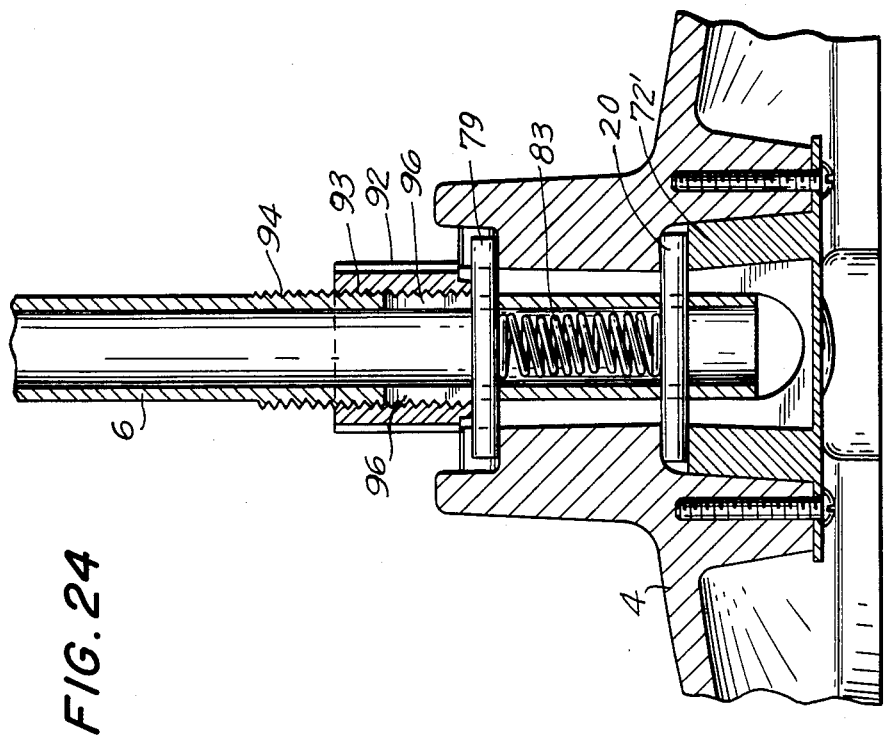

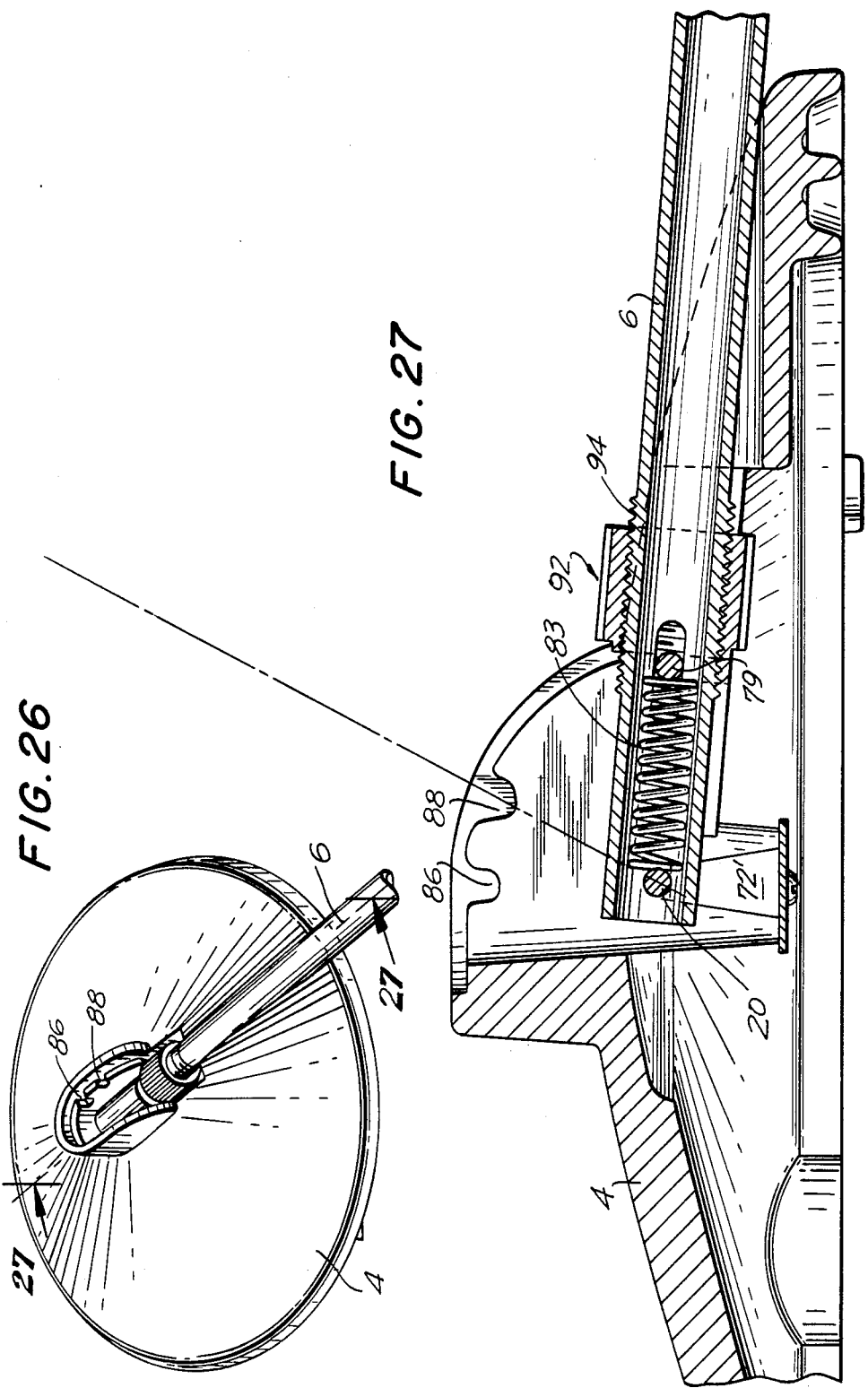

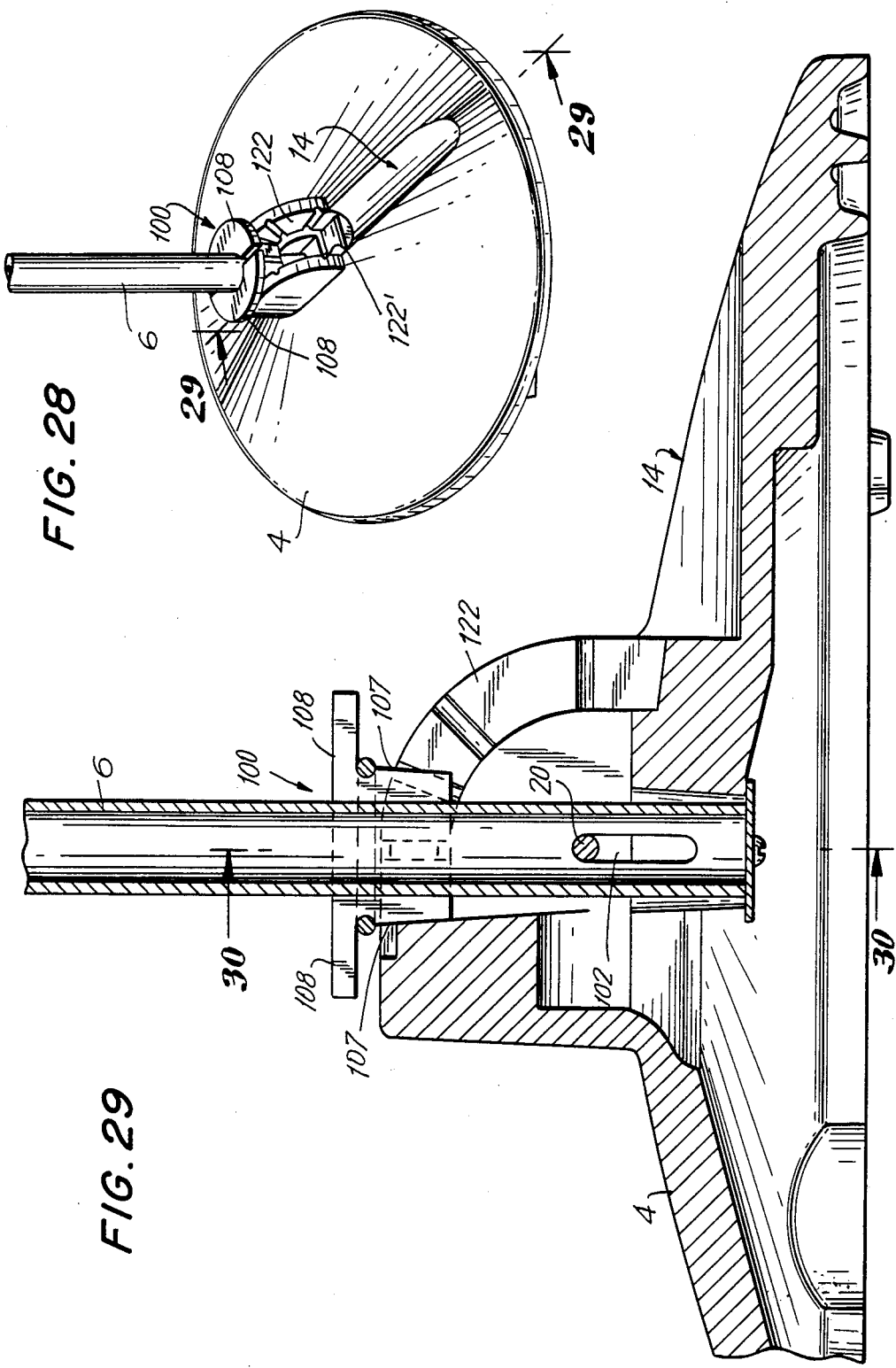

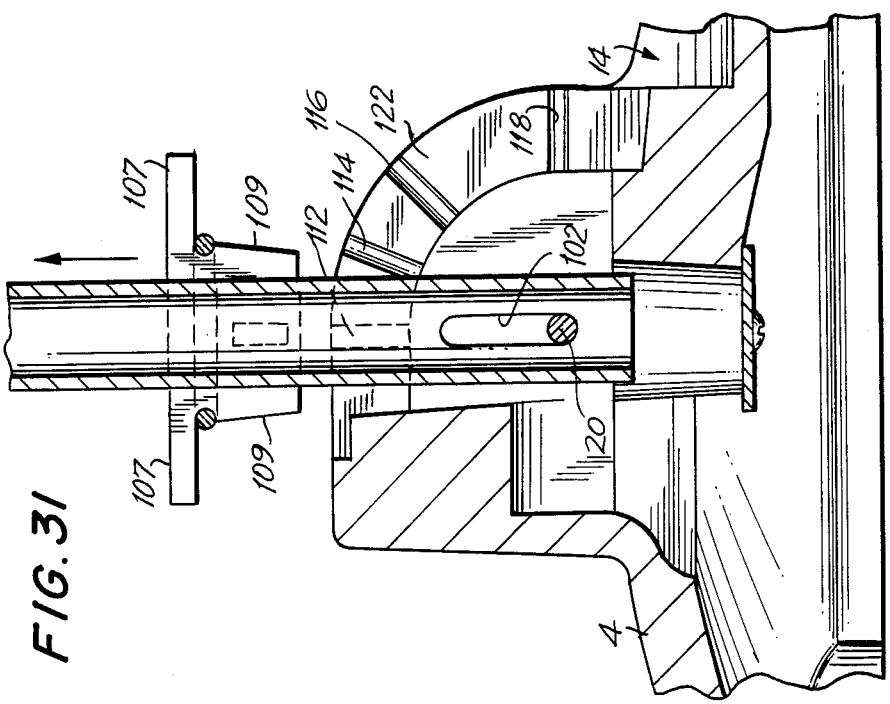
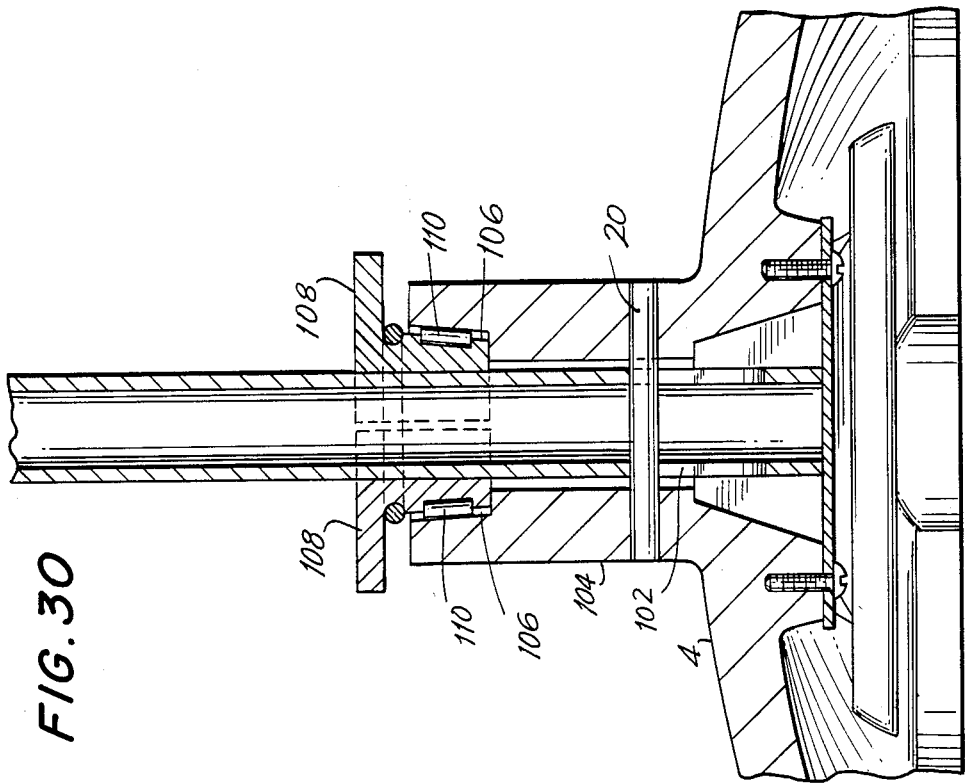
FIG. 31
FIG. 30

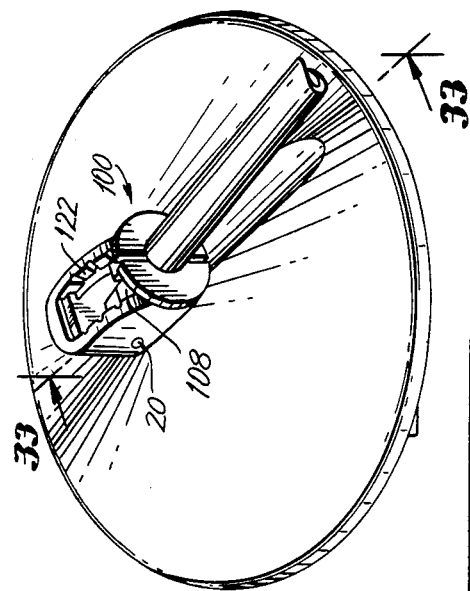
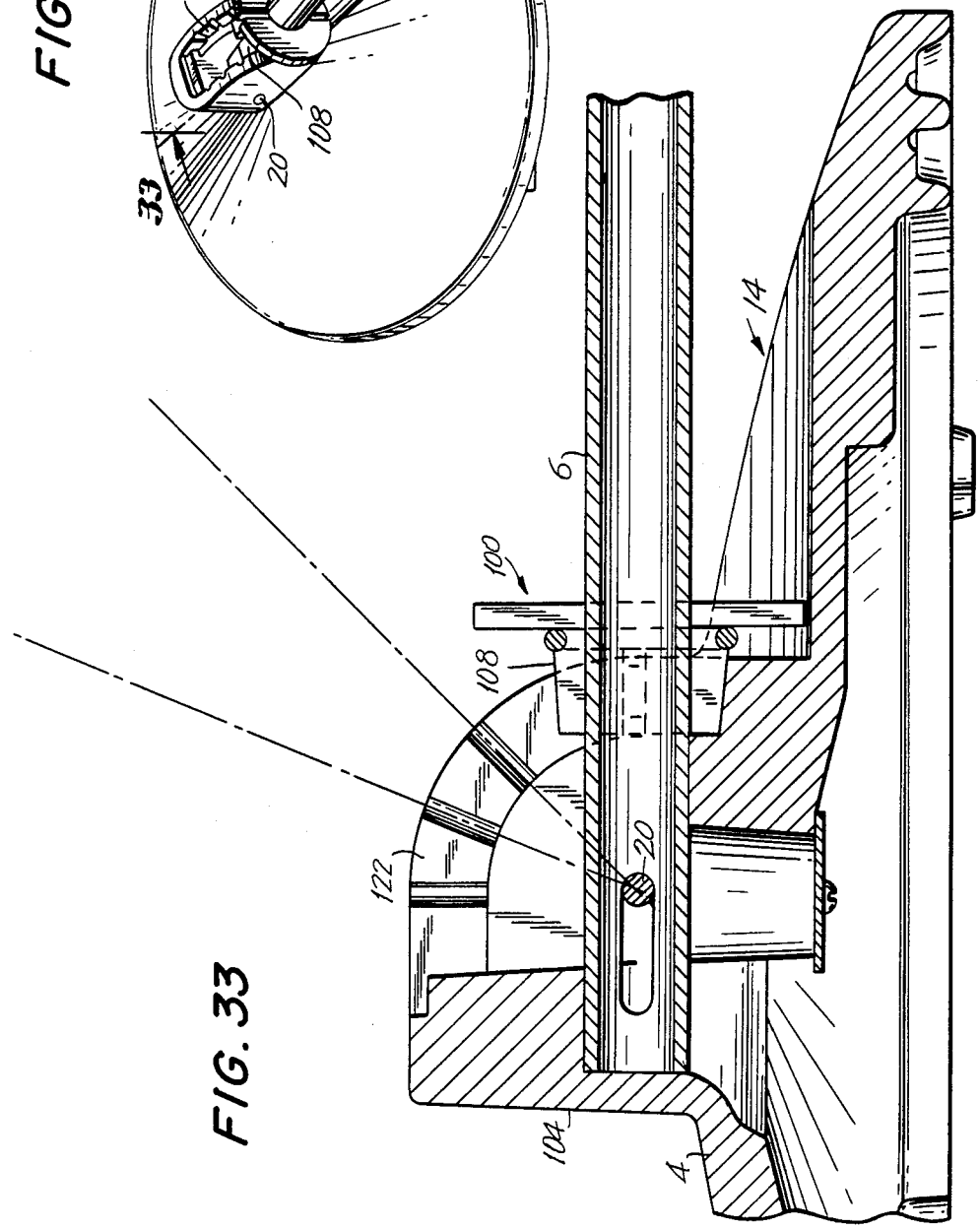

FOLDING MICROPHONE STAND

The present invention relates to microphone stands. More particularly, the invention relates to portable stands having a base and a stand tube which can be pivoted on the base from an erect position to a storage position.

It is usual, when using microphones with a live performer, to place one or more microphones on a stand at the level of the performer's mouth, a musical instrument, or both, so as to assure good pick-up of the sound. Under many circumstances it is desirable for the microphone stand to be collapsible to facilitate transportation by the performer or the recording specialist when he travels. Known folding stands which attempt to meet this need have been unsuccessful because of failure to provide a rigid, solid support which prevents the communication of unwanted vibrations to the microphone. Thus, folding tripod stands are not sufficiently stable and stands which provide the desired stability require substantial storage space, are not easily carried, and are not particularly compact, limiting their desirability for performers travelling in an automobile which has limited trunk space.

SUMMARY OF THE INVENTION

The present invention solves the above problem by providing a folding microphone stand having a heavy base in which a joint between a heavy base casting and the stand tube to which the microphone can be attached can be locked in place. In one embodiment, a segmented cone is provided whose inner diameter closely conforms to the outer diameter of the stand tube so as to be slidable thereon into engagement within a conical recess in the base. Pressure can be applied to the segments to enhance the grip of the segments on the stand tube and on the base, securely locking the stand tube in position.

The segmented locking cone has a plurality of segments which can be molded of plastic or cast in metal without the need for secondary operations. A spring wire, placed around the cone assembly in a groove which is undercut beneath the flanges, holds the segments together. The inward-facing cylindrical surfaces of the segments and the outer conical surfaces of the segments can be relieved so as to provide small contact areas, obviating the need for precisely formed surfaces and allowing the use of "as-cast" finishes on both the segments and the mating surfaces of the base.

The stand tube is pivotable on a pin at the bottom of the stand tube which passes through the stand tube. Movement of the stand tube in a longitudinal direction is constrained by slots in the base which receive the ends of the pin; sufficient travel of the stand tube is provided to permit an upward pull on the stand tube to free it from the locked position.

According to one feature, the base includes a storage recess which is molded in the base, and the stand tube pivots on the pivot pin so that its bottom portion lies in the recess. Conical surfaces are provided on the inside of the recess against which the conical surfaces of the locking cone segments can be seated by the application of pressure to lock the microphone stand for storage and easy transportation.

In another embodiment of the invention, the pivot pin is movable in the stand tube and a locking pin lies parallel to it in the bottom portion of the stand tube. A pair of upward-facing cam surfaces are provided in the base on either side of the stand tube and the base. The ends of the locking pin can seat in notches which are formed in the cam surfaces at the erect, the stored, and at intermediate positions of the stand tube if intermediate notches are included. The pivot pin is free to travel a limited distance in longitudinal slots in the stand tube to permit motion of the stand tube between positions. The stand tube can be locked in a selected position by a sleeve on the stand tube which prevents motion of the second pin out of the selected notch.

It is an object of the invention, therefore, to provide a folding stand for supporting microphones and the like, in which the stand tube can be pivoted from an erect position to a position which is parallel to the supporting base.

It is still another object of the invention to provide a folding microphone stand which is easily carried.

It is still another object of the invention to provide a microphone stand of a solid, vibration-free character which is compact and easily stored, for example, in limited trunk space.

It is a further object of the invention to provide a portable stand having reduced storage space requirements compared to a non-folding stand.

It is a still further object of the invention to provide a folding microphone stand which has great stability.

It is still another object of the invention to provide a folding microphone stand in which a rigid, but readily collapsible, joint is provided between the stand tube and the base in which it is supported.

Still other objects and advantages of the invention will in part be obvious and will in part be apparent from the specification.

The invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 1 is a perspective view of a portable stand fabricated in accordance with the teachings of the invention;

FIG. 2 is a close-up perspective view of the stand of FIG. 1, showing details of the stand tube and segmented locking cone when in a vertical position;

FIGS. 3 and 4 are partial sectional views taken along lines 3—3 of FIG. 2 and lines 4—4 of FIG. 3, respectively, showing details of the base and segmented locking cone of the invention;

FIGS. 7, 8, and 10 are perspective views showing a second embodiment of the folding stand in an erect, a close-up and a folded position, respectively;

FIGS. 9 and 11 are cross-sectional views, taken respectively along line 9—9 of FIG. 8 and line 11—11 of FIG. 10, showing the folding stand of FIG. 7 in an erect and in a stored position;

FIG. 12 is a perspective view of the locking cone of FIGS. 7-11;

FIG. 13 is a perspective view of a modified base construction having a cast-in handle and a cast-in hanging hole;

FIGS. 14 and 15 show various combinations in which plural folding stands of the invention can be compactly arranged for storage;

FIGS. 16 and 20 are perspective views respectively showing a third embodiment of the invention in an erect and in a stored position;

FIGS. 17 and 18 are partial cross-sectional views of the base and of the stand tube, taken, respectively, along line 17—17 of FIG. 16 and line 18—18 of FIG. 17;

FIGS. 18A is a perspective view of the pivot pin retaining spring of FIG. 18;

FIGS. 19 and 21 are sectional views of the base and tube stand of FIG. 16 in the erect and the stored position, respectively;

FIGS. 22 and 26 are perspective views respectively showing a fourth embodiment of the invention with the stand tube in an erect and in a stored position;

FIGS. 23 and 24 are partial cross-sectional views along line 23—23 of FIG. 22 and 24—24 of FIG. 23, respectively, showing the construction of the locking joint of the stand of FIG. 22;

FIGS. 25 and 27 are sectional views showing the joint of the microphone stand of FIG. 22 in an unlocked erect position, and a locked horizontal position, respectively;

FIGS. 28 and 32 are perspective views of a fifth embodiment of the invention, showing the tube stand in an erect position and in a stored position, respectively;

FIGS. 29 and 30, are sectional views taken along line 29—29 of FIG. 28 and line 30—30 of FIG. 29, respectively of the microphone stand of FIG. 28; and FIGS. 31 and 33 are sectional views showing the microphone stand of FIG. 28 in the erect and in the stored position.

DETAILED DESCRIPTION OF THE INVENTION

Figure 4:
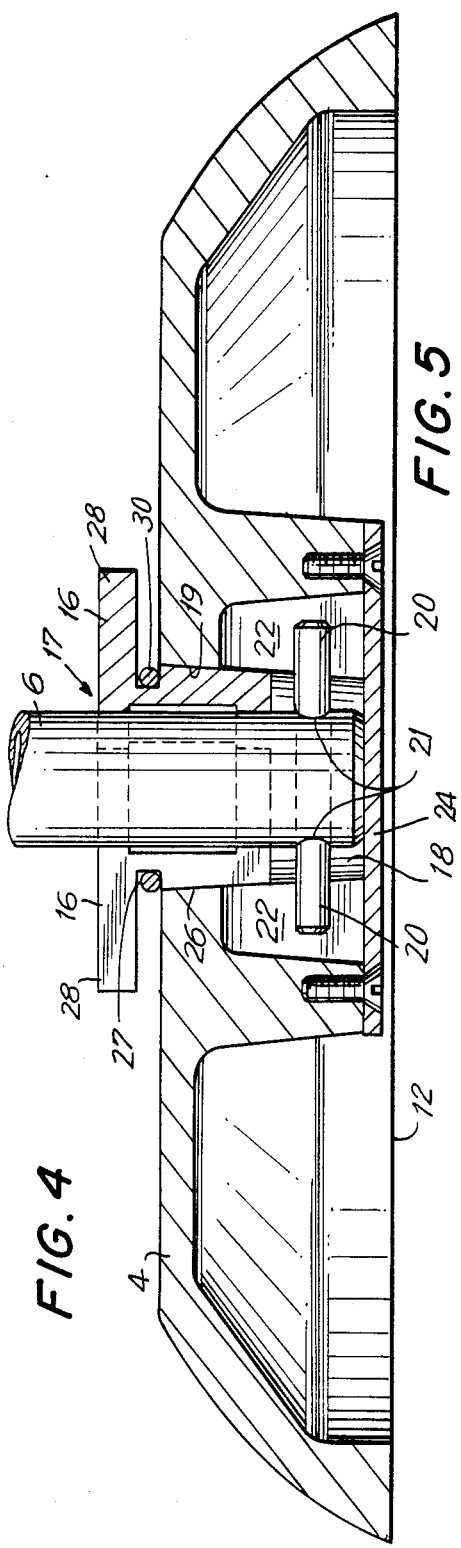
Figure 5:
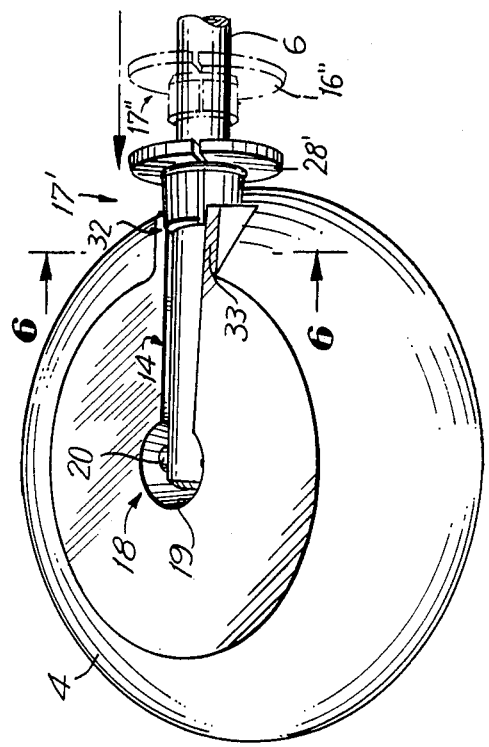
FIG. 5 is a perspective view showing the portable stand of FIG. 1 in a folded position.

Reference is first made to FIGS. 1-6, where a first embodiment of the invention is depicted. FIG. 1 illustrates a folding microphone stand 2 having a base 4 and a stand tube 6 which is conventionally provided at its upper end with a telescoping upper stand tube portion 10 onto which a microphone (not shown) may be conventionally threaded. Upper stand tube portion 10 may be extended and then locked at a convenient height by means of a conventional threaded sleeve 8. Stand tube 6 is pivotally supported in base 4, as detailed in FIGS. 2-6, and can move between an erect position (FIG. 1) and a stored position (FIG. 5). When erect, stand tube 6 is centered in upward-facing opening 18 of base 4. When stored, tube 6' lies generally parallel to undersurface 12 of base 4, a bottom portion being received within a storage recess 14 in base 4. (FIG. 3) Storage recess 14 may be formed in base 4 when the base is formed by casting. When in the upright position, as shown in FIGS. 1 and 2, or the stored position, as shown in FIGS. 3 and 5, stand tube 6 is locked in position by means of a movable locking cone 17 which is formed of three locking segments 16. Locking cone 17 may be seated on generally conical, surfaces in upper opening 18 or in storage recess 32 as shown at 17'.

A pivot pin 20 is fastened in holes 21 in opposite walls of stand tube 6, near the bottom thereof. Pin 20 extends on either side of the stand tube into inverted slots 22 which are formed in the inner wall 19 of upward opening 18 (FIGS. 3 and 4). When erect, stand tube 6 is free to move downward to seat on a fixed underplate 24. In the alternative, stand tube 6 can be lifted to clear its bottom end so as to permit rotation from the erect position to a resting position 6' in storage recess 14 (FIGS. 3 and 5), positioning the pivot pin on the axis of the storage recess when the stand tube is in the storage position.

Figure 6:
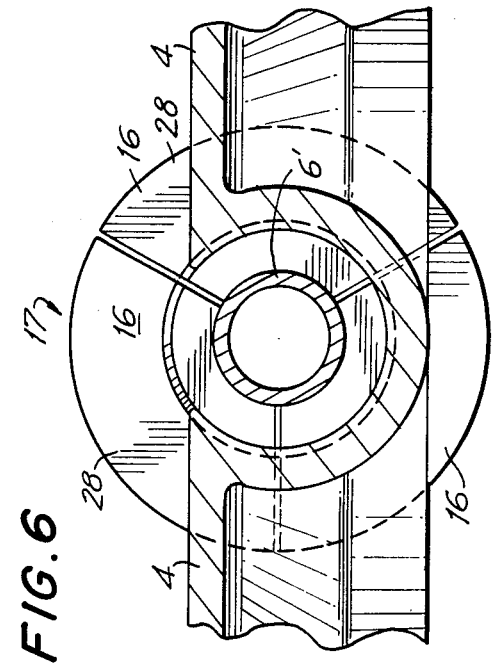
FIG. 6. is a sectional view taken along line 6—6 of FIG. 5, showing the segmented locking cone and the stand tube in a stored position.

When the stand tube is in the desired position, the three identical locking segments 16 of locking collar 17, are pressed down, conveniently by foot pressure on one of the flanges 28, to seat their respective lower conical surfaces 26 on the adjacent, conical wall portions 19 of upper opening 18 in base 6. A circular spring, or an O-ring, 30 is seated in a peripheral groove 27 which encircles segments 16, lying between flanges 28 of locking segments 16 and the adjacent conical surfaces 26. Circular spring 30 retains locking segments 16 on stand tube 6 when the segments are not positioned in a base opening, as shown at 16" in FIG. 5, while permitting sliding motion of the locking segments into and out of engagement with the base. Motion of the locking cone out of a base opening thus permits rotation of tube 6 between the erect position and the stored position. As can be seen in FIGS. 2, 3, 5, and 6, when stand tube 6 has been laid in storage recess 14, locking segments 16 can be inserted into side opening 32. Side opening 32 is formed in a rectangular boss 33 which is formed on the surface of base 4; side opening 32 opens onto storage recess 14. FIGS. 5 and 6 show segments 16' of locking cone 17' pressed into place for retaining the microphone stand assembly in its storage position.

It is a feature of the invention that stand tube 6 can be securely locked in either the upright position or the stored position by forcibly seating segments 16 of locking cone 17 to seat in either upper opening 18 or in side opening 32 of base 4. The locking action is provided by the engagement of the convex tapering surface 26 of each segment 16 with a similarly shaped, concave tapering surface 19 (in upper opening 18) or 31 (in storage recess 14). In a preferred embodiment these surfaces all lie in the surface of an imaginary cone which tapers gently in the direction of the bottom of stand tube 6. While conical surfaces are preferred, it is to be understood that the mating surfaces may also, for example, be flat, as shown in the embodiment of FIGS. 28-33.

A second embodiment of the invention is depicted in FIGS. 7-12, where an upward opening 27, for receiving cone 44, is formed in a neck 42 which extends upward on base 4. As with the previous embodiment, the inside walls 26 of opening 25 are slightly tapered, preferably at an included angle of about 5°, into opening 27. In this embodiment, pivot pin 20 is fixed in stand tube 6 and its ends extends on either side thereof into a pair of recesses 22 which are formed in oppositely facing portions of inner wall 27 of neck 42. In this embodiment, the storage recess consists of a side opening 40 in neck 42.

Locking cone assembly 44 of the second embodiment, as best seen in FIG. 12, is formed of three segments. Two of the segments are identical, and have full flange portions 48. A third segment 50 has a flat 52 formed on its periphery, but is otherwise identical to the segments marked 46. Each axially projecting conical portion 56 of the locking segments has relieved inner and outer surfaces which facilitate contact of the segment with the stand tube and with a locking surface of base 4. Thus, the inside surface of each segment is relieved from about an eighth of an inch above the bottom of the conical portion to about an eighth of an inch below the top, so as to provide a recess 58 between each lower curved surface 57 and upper curved surface 59 (FIGS. 11 and 12). The outside surface of each conical segment 56 is also relieved to provide three raised longitudinal ribs 60. The substantially flat surface 60' of each rib 60 converges slightly in the axial direction towards the bottom of stand tube 6 for locking engagement with a facing conical surface portion of inner wall 26. By so relieving the inside and the outside surfaces of the locking cone assembly, the surfaces of the segments which meet the outer surface of stand tube 6 and conical inner wall 26 of base opening 27 all contribute to the locking action of the cone with the stand tube and with the base. It is a feature of the invention that these surfaces need not be highly finished, but can be "as-cast" surfaces which are formed on the locking segments and on the base when they are made of cast metal. Further, when the angles of the mating conical surfaces deviate at an included angle of 2° from parallel with the axis, a "self-lock", segmented locking collar assembly is provided. A "self-lock" cone arrangement, however, frequently requires the use of an impact tool or a lever to cause the cone to release. It has also been found that a good retaining action can be obtained without hard locking of the segmented locking assembly when the aforementioned included angle is made approximately 5°. In the latter case, the locking cone can be released easily by simply pulling stand tube 6 out of its seated position.

It is a feature of the second embodiment of the invention that stand tube 6 may be further locked in its stored position by rotation of locking cone 44 after the stand tube has been placed in the storage position. To this end, preparatory to lowering stand tube 6 into the storage position, locking cone assembly 44 is first turned so that flattened surface portion 52 of segment 50 faces downward toward a slot 62 which is formed in base 4 (FIG. 11). After lowering, stand tube 6 is locked in the storage position by first sliding the locking cone assembly into side opening 40 and then turning segmented conical locking assembly 44 to bring a portion of the periphery 54 of the flange 50 into slot 62. Thus, a large radius portion of flange 50, of an adjacent flange 48, or of both is moved into slot 62 to block reverse movement of the locking cone (FIG. 10). To release stand tube 6 from the stored position, the locking cone is rotated to remove the long radius flange portion from slot 62, leaving the short radius portion, e.g., flat surface 52 of segment 50, outside of slot 62. Then locking cone 44 can be slid on stand tube 6 out of side opening 40, to permit the raising of the stand tube toward the erect position.

FIGS. 13, 14, and 15 depict a base 4 which has been modified to provide contoured openings 62 and 64 for use in transportation and storage of the folded stand. As best seen in FIG. 13, hole 62 is cast in the shape of a hand-hole and is useful when carrying the stand. Hole 63 provides a convenient hanging point for the stand. Hole 64 being located near the stored stand tube 6, can receive the free end portion of another stand tube 6 when both are folded and placed together for storage. As depicted in FIG. 14, two folding stands have their stand tubes 6 in the storage position, with each base 4 receiving the end of the stand tube of the other stand. The resulting assembly provides both compact storage and easy portability.

Two such assemblies of folded microphone stands are shown in FIG. 15, each pair having been assembled as in FIG. 14, and then placed back-to-back in FIG. 15, to provide compact storage and convenient portability for four folded stands.

Figure 21A:
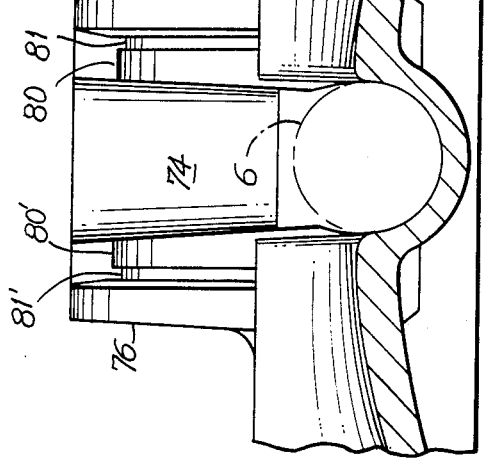
FIG. 21A is a view in cross-section along lines 18—18 of FIG. 21, showing detail of the base of FIGS. 16-21.
Figure 20:
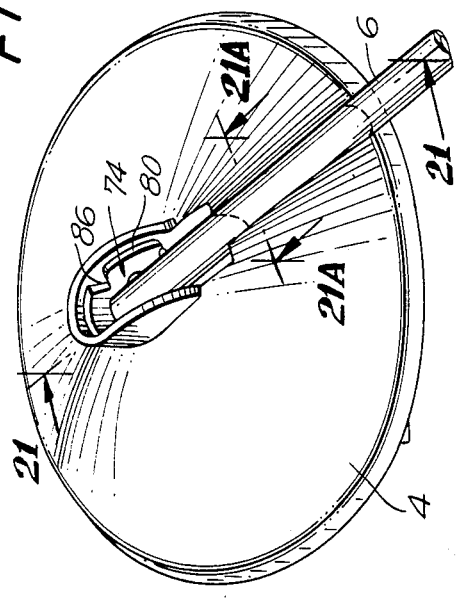
Figure 21:
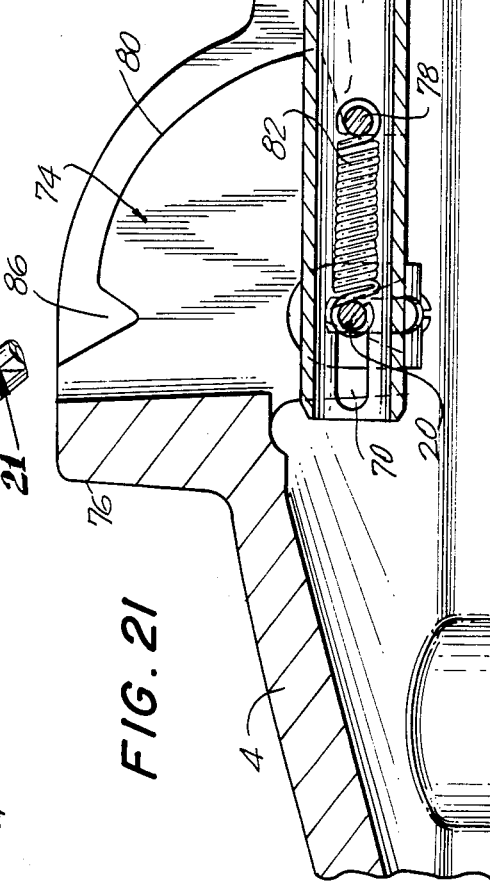

A third embodiment of the invention is depicted with stand tube 6 erect in FIGS. 16–19 and stored in FIGS. 20–21. In this embodiment, longitudinal movement of the stand tube relative to the base is accomplished as depicted in FIGS. 17–19 and 21, by means of a pair of elongated, closed-ended slots 70 in opposite walls of the stand tube 6, near the bottom thereof. Pivot pin 20 extends transversely through both slots, and its ends seat by the action of coil spring 82 in a pair of oppositely disposed, inverted, V-shaped slots 72 in base 4. Inverted slots 72 are located on either side of a laterally-extending slot-like cavity 74 in base 4. Cavity 74 lies within a raised U-shaped portion 76, which is formed integrally with base 4. Raised portion 76 resembles the collar of FIGS. 7–15, except that the storage recess 14 now extends from cavity 74.

Spaced apart from and located above pivot pin 20 in the lower end of stand tube 6, is a second transverse pin 78. Locking pin 78 is fixed in stand tube 6 and lies parallel to pivot pin 20. The ends of locking pin 78 extend beyond stand tube 6 and act like cam followers in that each rides on one of the upward-facing surfaces 80 and 80' which are formed on the opposite inward-facing walls of cavity 74. Coil spring 82, fastened between pivot pin 20 and locking pin 78, within stand tube 6, maintain tension therebetween, urging stand tube 6 downward and urging the ends of locking pin 78 upward into notches 86 and 86' on either side of cavity 74. Gutters 81 and 81' are located outside of upward-facing surfaces 80 and 81' (FIG. 21A) to insure even wear of the adjacent surfaces and to avoid interference of a side wall with motion of the pin.

In this embodiment, the application of lifting force to stand tube 6, e.g., a force which is applied in a direction away from the base, raises the ends of locking pin 78 from their seats in whichever of notches 86, 86' or 90, 90' are occupied, freeing stand tube 6 for rotation. When stand tube 6 has been moved to the desired position, the lifting force on tube 6 is released and coil spring 82 effects inward axial movement of stand tube 6 to seat locking pin 78 and the stand tube in the new position. Note that when stand tube 6 is erect, the ends of pivot pin 20 are seated in slots 72; the ends of pivot pin 20 are retained in the base, when stand tube 6 is in the stored position by the combined actions of a washer 93 and a spring 91 which are respectively fastened by screws 92 to downward-extending bosses 94 under base 4 (FIG. 18). As seen in FIGS. 18 and 18a, spring 91 has a mounting tab portion 91a which contains a hole 91b for its mounting screw 92. Angled off from tab 91a so as to provide resilience, is pressure portion 91c which contains a slot 91d through which pivot pin 20 passes (FIG. 18). In operation, pressure portion 91c bears against the bottom end of stand tube 6, around pivot pin 20, and urges stand tube 6 to one side (not shown) to prevent rattling of the stand tube against the base.

The embodiment of FIGS. 22–27 is similar to that of FIGS. 16–21, except that the retention of locking pin 79 in notches 86, 88 or 90 is assured by means of a knurled locking sleeve 92. To this end, stand tube 6 is provided, where it emerges from base 6, with raised threads 94 onto which a mating thread 93 inside of sleeve 92 can be threaded. When fully engaged, locking sleeve 94 presses down on locking pin 79 in stand tube 6. Locking pin 79 passes through the walls of stand tube 6 in oppositely disposed longitudinal slots 96 so that it can, when free of sleeve 92, move along the longitudinal axis of the tube. Pivot pin 20 is fixed in tube 6, and its ends are received in inverted recesses 72' of base 6. Locking pin 79 is urged upward, away from pin 20, by energy stored in the compression of coil spring 83. When not constrained by locking sleeve 92 locking, pin 79 is free to move upward under the force of spring 83, out of engagement with cam 80; stand tube 6 is then free to move between position (FIG. 25). When stand tube 6 is to be locked in the upright position, as shown in FIGS. 23 and 24, locking sleeve 92 is screwed down against locking pin 78, so that it cannot move out of notch 86. Pin 78 can, of course, be locked in notch 88 or 90 in the same manner.

Another locking arrangement which utilizes the teachings of the invention is shown in FIGS. 29-32. In this embodiment, Stand tube 6 rotates between positions on a pivot pin 20 which is fixed within upward extending projection 104 of base 4. Stand tube 6 is longitudinally movable on pivot pin 20, its movement being constrained by pivot pin 20 which passes through a pair of longitudinal slots 102 in the stand tube near the bottom. Slots 102 thus limit axial travel of the stand tube 6 while freeing it for rotation on pivot pin 20 between an erect position, a plurality of slanted position, and a horizontal storage position. As in the previous embodiment, base 4 is provided with a collar-like central projection 104, one side of which is open and provides a recess 14 for storage of the stand tube. Projection 104 provides support for, and allows motion of, stand tube 6 between inner surfaces 122, 122'. Segmented locking assembly 100 has two identical tapered segments 108 of rectangular cross-section which are provided with flanges 107. As best seen in FIGS. 30 and 31, the downward-extending flat contact surface 109 of each segment 108 is provided with an elongated spine-like projection 110 which is dimensioned to fit into any one of the radially disposed notches or slots 112, 114, 116, and 118 in the oppositely disposed inside surfaces of projecting collar 104 (FIGS. 31, 33). Locking segments 108 are held together in a sliding assembly on the surface of stand tube 6 by means of a surrounding coil spring or O-ring 30 which is conformably seated in a groove 124 (FIG. 29), which lies between flange 107 and locking surface 106 in each segment. In this embodiment, locking segments 108 have flat locking surfaces, which converge slightly toward the pivot point, at the included angle of the previous embodiments. It will be understood, however, that conical surfaces may be used which then make line contact with inside surfaces 122,122'. As shown in FIGS. 28 and 32, the illustrative collapsible stand of this embodiment is capable of positioning stand tube 6 at a number of intermediate positions in addition to the usual vertical and horizontal storage positions.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is

1. A folding microphone stand for supporting an object, the folding stand comprising:
    stand tube means having a top portion to which an object may be attached, and a bottom portion;
    base means in which the bottom portion of the stand tube means is centrally and pivotally supported for motion between an erect position and a stored position and which includes V-shaped slots and recess means for receiving the stand tube means in the stored position;
    locking means on the stand tube means for engaging the base means to secure the stand tube means in at least the erect position and the stored position;
    pivot means pivotable within the V-shaped slots for retaining the bottom portion of the stand tube means in the base means, the pivot means providing limited longitudinal movement of the stand tube means relative to the base means, the pivot means permitting rotation of the stand tube means between the erect position and the stored position;
    engaging means on the base means for engagement with the locking means in each of said positions; and
    resilient means connected to the pivot means and the locking means to urge the locking means into engagement with the engaging means.

2. The folding stand of claim 1 wherein the base means comprises parallel surfaces, and further comprising:
    oppositely disposed notches in the parallel surfaces for engaging the locking means.

3. The folding stand of claim 2 wherein the parallel surfaces extend on either side of the stand tube means.

4. The folding stand of claim 1, and further comprising:
    an upward-extending projection on the base means which surrounds the stand tube means in the erect position, and
    cavity means extending laterally from the projection into which the stand tube means can be pivoted for storage.

5. The folding stand of claim 4 wherein the cavity means further comprises:
    notches for engaging the locking means in at least the erect position and the stored position.

6. The folding stand of claim 5 wherein the notches are provided in pairs at the erect position and the stored position and wherein the locking means has laterally extending portions for engaging the notches.

7. The folding stand of claim 6 wherein the locking means comprises a locking pin which is fastened through the stand tube means.

8. The folding stand of claim 6 wherein the cavity means further comprises:
    a pair of surfaces which face inwardly toward and extend parallel to the stand tube means and having slots which serve as said notches.

9. The folding stand of claim 6, and further comprising:
    gutter means disposed between the upward-extending projection and cavity means for avoiding interference between the upward-extending projection and laterally extending portions of the locking means.

10. A folding microphone stand for supporting an object, the folding stand comprising:
   stand tube means having a top portion to which an object may be attached, and a bottom portion;
   base means in which the bottom portion of the stand tube means is centrally and pivotally supported for motion between an erect position and a stored position and which includes recess means for receiving the stand tube means in the stored position;
   locking means on the stand tube means for engaging the base means to secure the stand tube means in at least the erect position and the stored position;
   pivot means for retaining the bottom portion of the stand tube means in the base means, the pivot means providing limited longitudinal movement of the stand tube means relative to the base means, the pivot means permitting rotation of the stand tube means between the erect position and the stored position;
   engaging means on the base means for engagement with the locking means in each of said positions;
   resilient means connected to the pivot means and the locking means to urge the locking means into engagement with the engaging means; and
   bias means for pressing the bottom portion of the stand tube means against the recess means.

11. The folding stand of claim 10, wherein the bias means includes an opening through which the pivot means extends.

12. A folding microphone stand for supporting an object, the folding stand comprising:
   stand tube means having a top portion to which an object may be attached, and a bottom portion;
   base means in which the bottom portion of the stand tube means is centrally and pivotally supported for motion between an erect position and a stored position and which includes recess means, an upward-extending projection surrounding the stand tube means and cavity means having a pair of surfaces which face inwardly toward and extend parallel to the stand tube means; said cavity means and recess means for receiving the stand tube means in the stored position;
   locking means on the stand tube means for engaging the base means to secure the stand tube means in at least the erect position and the stored position;
   pivot means for retaining the bottom portion of the stand tube means in the base means, the pivot means providing limited longitudinal movement of the stand tube means relative to the base means, the pivot means permitting rotation of the stand tube means between the erect position and the stored position;
   engaging means on the base means for engagement with the locking means in each of said positions;
   resilient means connected to the pivot means and the locking means to urge the locking means into engagement with the engaging means;
   bias means for pressing the bottom portion of the stand tube means against the cavity means; and
   gutter means disposed between the upward extending projection and cavity means for avoiding interference between upward-extending projection and portions of the locking means.

* * * * *